MODULATOR FOR VOICE FREQUENCY TELEGRAPH SYSTEMS

Filed Oct. 16, 1953 2 Sheets-Sheet 1

INVENTORS
W. SCHALLERER
R. MOSCH
BY R. P. Morris
ATTORNEY

Feb. 4, 1958 W. SCHALLERER ET AL 2,822,421

MODULATOR FOR VOICE FREQUENCY TELEGRAPH SYSTEMS

Filed Oct. 16, 1953 2 Sheets-Sheet 2

INVENTORS
W. SCHALLERER
R. MOSCH
BY [signature]
ATTORNEY

United States Patent Office 2,822,421

Patented Feb. 4, 1958

2,822,421

MODULATOR FOR VOICE FREQUENCY TELEGRAPH SYSTEMS

Wilhelm Schallerer, Darmstadt, and Rudolf Mosch, Ditzingen, Wurttemberg, Germany, assignors to International Standard Electric Corporation, New York, N. Y., a corporation of Delaware Application October 16, 1953, Serial No. 386,611

Claims priority, application Germany October 16, 1952

4 Claims. (Cl. 178—66)

The invention relates to a telegraph modulator for voice frequency telegraph systems and particularly to a universal modulator suitable for operate-on-current and operate-on-zero-current systems.

For a long time, the sending relay in voice frequency systems (VFT) has been replaced by the so-called telegraph modulator which has several important advantages over the relay. This modulator comprises non-linear resistors, the value of which is varied by the local (loop-) circuit by the incoming D. C. signals. These controllable resistors are so coupled to a 4-terminal network together with supplementary fixed resistors that they influence the network attenuation between a source of alternating current and a utility circuit connected to the output. Fig. 1, for example, shows schematically such a modulator with a controllable longitudinal resistor $R_l'$ and a cross-resistor $R_q'$, controllable in the opposite sense. If the control voltage $U_s$ or the controlling current $J_s$, respectively, varies between two specified values of opposite polarity, then the four-terminal network has but little attenuation in the one case, and high attenuation in the other case. $UT_0$ is the signal carrier source with an internal resistance $R_i'$, whereas $R_a$ represents the load i. e. the utility circuit.

With regard to teletypewriter dial traffic it is generally required that the modulator has a specified attenuation, depending, of course, on the telegraph system, and if the control circuit assumes the zero-current condition ("rest attenuation"). With the operate-on-current system, the rest attenuation must be high, whereas with the operate-on-zero current system, it must be low. The conventional telegraph modulators satisfied this requirement by providing for longitudinal and cross resistors, non-linear circuit elements, with strongly diverging resistance in the zero current condition; or by providing longitudinal and cross resistors that were correspondingly shifted in ratio by transformers. The modulators for operate-on-current and operate-on-zero current thus displayed essential differences which rendered it impossible to employ the same modulator, without considerable additional equipment, for both operating systems.

This invention provides a universal modulator having the favorable characteristics of the types known heretofore, and is capable of changing from operate-on-current to operate-on-zero current operation, and vice versa. This is so attained that the rest attenuation of the modulator is adjustable, alternatively, to a high or low value by non-linear resistors (preferably rectifiers).

The modulator according to the invention has the further advantage over the known circuit arrangements which permits its output to be matched to the load by simple means, for both switching stages, i. e. for the rest condition and during the emission of signals.

These and other features and advantages of the invention will be explained, based on a sample embodiment of the invention and with reference to the attached drawing.

Figure 1:
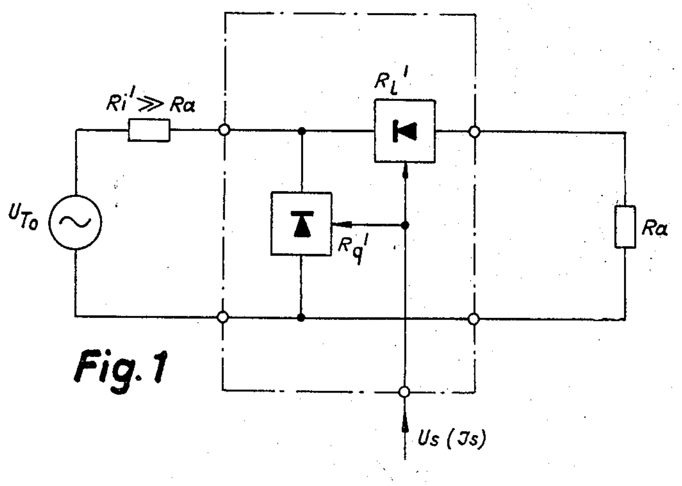
Fig. 1 is an illustration of a well known modulator described above.
Figure 2:
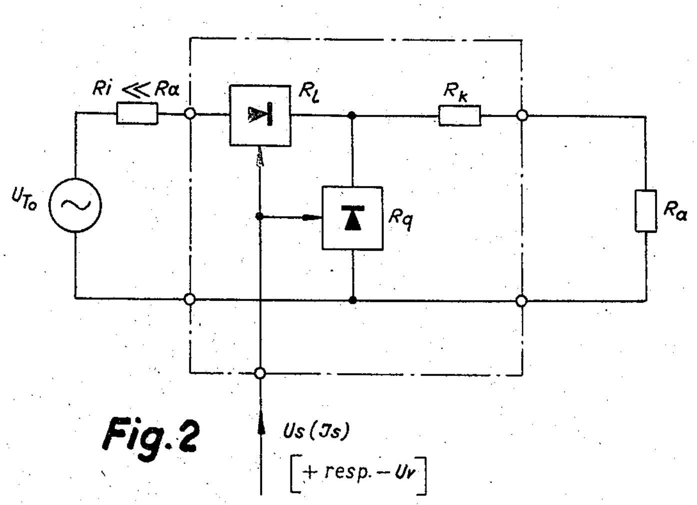
Fig. 2 illustrates schematically a modulator according to the invention.

Referring now to Fig. 2, the modulator proper is circumlined by alternate dots and dashes. $R_l$ and $R_q$ are controllable resistors which are here equal, unlike $R_l'$ and $R_q'$ of Fig. 1. $R_l$ and $R_q$ represent the variable longitudinal and cross resistors, respectively, of the modulator and are controlled in opposite senses by the voltage $U_s$, so that for instance $R_l$ may assume its blocking resistance and $R_q$ its passing resistance.

Now, in order to attain the desired high or low rest attenuation of the modulator, a suitably poled bias voltage $U_v$ is added to the control voltage $U_s$; the bias voltage keeps the modulator in the switching condition as required, in the case $U_s$ fails.

Besides satisfying the requirement for change-over switching, there are other advantages which are evident. For example, the two non-linear resistors should be equal. Consequently, this implies precision components.

However, these resistors are so biased by means of the bias voltage $\pm U_v$, that the control voltage $\pm U_s$ will in its effective direction always find a steeply descending or ascending resistance curve of the controlled resistor and that it therefore induces a considerable resistance variation. If, for instance, $R_l$ is so biased that the operating point is in the upper bend of the characteristic curve plotting resistance against voltage, then the conditions at $R_q$ are just reversed and its operating point is at the lower bend. Through $\pm U_s$, there occurs then in both cases a shifting along the steep section of the characteristic curve. Now comparing this with Fig. 1, it is seen that $R_l'$ and $R_q'$ are equally biased to zero potential, so that shifting in the direction of the steep curve section occurs only for instance at $R_l'$, whereas it takes place within the flat curve section at $R_q'$ which means implementation of but a slight resistance variation.

Finally, the current drawn by the modulator from the loop circuit is approximately equal for both switching conditions (+ and $-U_s$), so that no unbalance of loop circuit load occurs.

It is seen in Fig. 2 that the modulator, viewed from the generator, begins with a longitudinal resistor. Therefore, $R_l << R_a$ and the modulator compared with the internal resistance of the carrier source acts as a high-resistance element.

According to a further feature of the invention, resistor $R_k$ may be employed to match the modulator to the load $R_a$ during all switching conditions. The optimum control effect will be attained if this equation is satisfied:

$$R_k+R_a=\sqrt{R_dR_s}>>R_i$$

where $R_d$ is the passing resistance of $R_q$, and $R_s$ is the blocking resistance of $R_l$.

If, furthermore, there is arranged $R_k \approx R_a$, there will then be obtained (since $R_d<<R_a=R_k$), the matched condition. For if $R_l=R_s$ and $R_q=R_d$, then the load sees the resistance $R_k+R_d$, where $$R_k \approx R_a$$

$$R_d<<R_a$$

If, however, there is the reversed condition $R_l=R_d$ and $R_q=R_s$, then the load sees the resistance $R_k+R_d+R_i$, where $$R_k \approx R_a$$

$$R_d<<R_a$$

$$R_i<<R_a$$

The above matching conditions may be, and preferably are satisfied by transformers.

Figure 3:
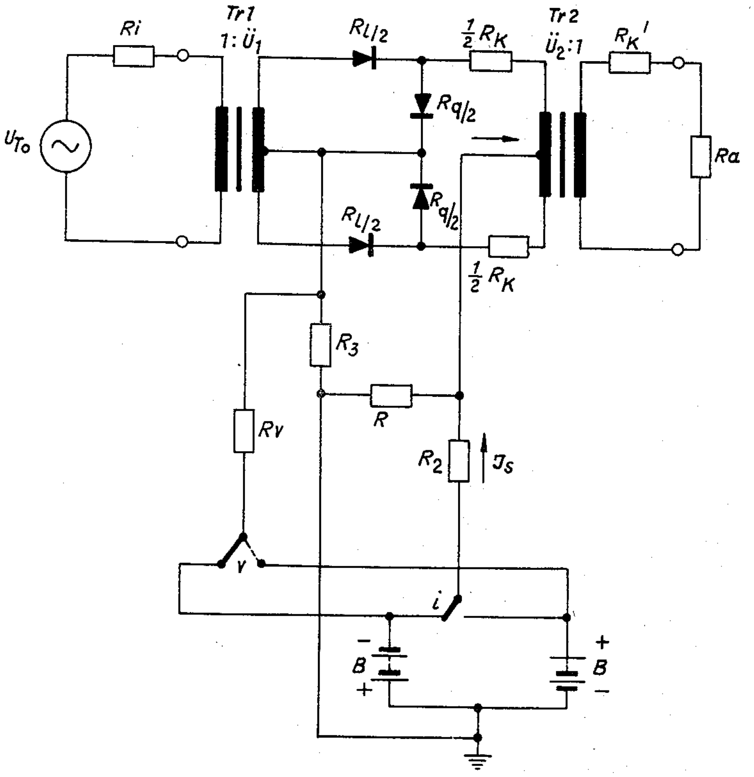
Fig. 3 illustrates an embodiment of a modulator according to the invention.

Fig. 3 shows an example of a complete circuit arrangement of the modulator according to the invention. The non-linear resistors are divided and arranged within a bridge. The transformer $Tr_1$ serves for matching the resistance of the generator, and $Tr_2$ for matching the load $R_a$.

The transformers permit at the same time decoupling of the modulator output and of the carrier supply to the control circuit. The transformers are of conventional design and the transformers on the carrier side may normally constitute the output transformer of the generator, at the same time.

The rectifiers are normally employed as non-linear resistors. Linearization of the rectifiers is here easily obtained in that the resistor $R_k$ (Fig. 2) is symmetrically divided and is entirely or partially placed between $R_q$ and Tr2 (½ $R_k$ of Fig. 3). This linearization works in like manner for $R_l$ and $R_q$.

If not the entire resistor $R_k$ of Fig. 2 is utilized for linearization, then one portion of it may be placed in series to the secondary winding of the transformer Tr2, as resistor $R_k'$.

Utilization of the resistor $R_k$ for matching and for linearization offers the advantage that the quality of the modulator is not reduced by additional linearization resistors.

The lower portion of Fig. 3 illustrates one type of biasing voltage means. Starting at the voltage source B, the positive or the negative voltage is impressed upon the resistor R of the loop circuit which is closed by the contact *i* of the pulse relay (not shown). The control voltage is derived from R and passed to the modulator. The resistance $R_2$ serves for establishing a constant current. The circuit for generation of the bias voltage $U_v$, which may be taken from the same voltage source as the control voltage, is closed through the contact *v*. The current is directed over the resistor $R_v$ and the resistor $R_3$ as lying in series with R, whereby the terminals of $R_3$ yield the bias voltage $U_v$ which is applied to the modulator.

While the principles of the invention have been described above in connection with specific embodiments, and particular modifications thereof, it is to be clearly understood that this description is made only by way of example and not as a limitation on the scope of the invention.

What is claimed is:

1. A modulator for voice frequency telegraph systems operable in both operate-on-current and operate-on-zero current conditions, said modulator comprising a four-terminal network having longitudinal means and cross-branch means respectively, at least one non-linear resistor connected in a longitudinal and a cross-branch, respectively, input and output circuits connected to said network, said non-linear resistors being so coupled in their respective branches that their resistance characteristics are opposite, means for keying said modulator, and means for applying selectively a biasing voltage of positive or negative D. C. simultaneously to said non-linear resistors and biasing them in the same sense whereby the rest attenuation for the modulator is defined for zero voltage condition.

2. The modulator according to claim 1, wherein said non-linear resistors are approximately equal.

3. The modulator according to claim 1, wherein said longitudinal means comprise a plurality of branches, each longitudinal branch having a non-linear resistor therein, said cross-branch means comprising a pair of non-linear resistors, means for connecting respective ones of said cross-branch resistors to respective ones of said longitudinal branch resistors to provide a pair of voltage dividing networks, and means coupling only one of said cross-branch resistors across the output circuit, said one being determined by the rest attenuation characteristic of said modulator.

4. The modulator according to claim 1, wherein a loop circuit is coupled between the input and output circuits of said modulator, and means in said loop circuit for controlling the biasing potential applied to said resistors.

References Cited in the file of this patent

UNITED STATES PATENTS

| | | |
|---|---|---|
| 2,152,764 | King | Apr. 4, 1939 |
| 2,181,312 | Arzmaier | Nov. 28, 1939 |
| 2,195,294 | Bahr | Mar. 26, 1940 |